United States Patent [19]
Arai et al.

[11] Patent Number: 5,651,492
[45] Date of Patent: Jul. 29, 1997

[54] HEATING DEVICE FOR A BONDING APPARATUS

[75] Inventors: Hisashi Arai, Akiruno; Nobuharu Moriya, Nishitama-gun, both of Japan

[73] Assignee: Kabushiki Kaisha Shinkawa, Tokyo, Japan

[21] Appl. No.: 714,941

[22] Filed: Sep. 17, 1996

[30] Foreign Application Priority Data

Sep. 18, 1995 [JP] Japan ................................. 7-263492

[51] Int. Cl.$^6$ .................................................. H01L 21/60
[52] U.S. Cl. ........................................... 228/42; 228/49.5
[58] Field of Search ........................... 228/111, 180.5, 228/219, 220, 6.2, 42, 49.5

[56] References Cited

U.S. PATENT DOCUMENTS

| | | | |
|---|---|---|---|
| 3,911,568 | 10/1975 | Hartleroad et al. | 29/626 |
| 4,732,313 | 3/1988 | Kobyasahi et al. | 228/4.5 |
| 4,976,393 | 12/1990 | Nakajima et al. | 228/220 |

FOREIGN PATENT DOCUMENTS

| | | | |
|---|---|---|---|
| 2-54664 | 11/1990 | Japan | H01L 21/52 |
| 5-58567 | 8/1993 | Japan | H01L 21/52 |

*Primary Examiner*—Samuel M. Heinrich
*Attorney, Agent, or Firm*—Koda and Androlia

[57] ABSTRACT

A heating device used in a bonding apparatus including a cover which is provided on a heating body so as to cover a guide groove which guides lead frames; and gas grooves are formed in the heating body so as to run along the guide groove, and an inert gas is supplied into the gas grooves so that the inert gas prevents the entry of air from the joining surfaces of the heating body and cover.

2 Claims, 3 Drawing Sheets

HEATING DEVICE FOR A BONDING APPARATUS

BACKGROUND OF THE INVENTION

1. Field of the Invention

The present invention relates to a heating device for a bonding apparatus.

2. Prior Art

In conventional bonding apparatus heating devices which prevent the oxidation of lead frames, a guide groove which guides the lead frames is formed in a heating body, and a cover is fastened to the upper surface of the heating body so that the guide groove is covered as disclosed in, for example, Japanese Patent Application Publication (Kokoku) No. 2-54664.

In this device, however, a gap may be formed at the joining surfaces of the heating body and cover as a result of the heat of the heating body, warping of the cover or surface roughness of the joining surfaces, etc., so that air enters from the outside. As a result, the easily oxidizable lead frames which are made of copper or a copper alloy, etc. may be oxidized, so that the reliability of bonding drops.

One method that has been used in the past to prevent the entry of air from the joining surfaces of the heating body and cover is a method in which [a] grooves are formed in the heating body at the joining surfaces of the heating body (heating block main body) and cover (upper-lid heating block), [b] a crushable member consisting of a metal such as aluminum or a stainless steel pipe, etc., is installed in these grooves, [c] projections which engage with the grooves in the heating body are formed on the cover, and [d] the crushable member is crushed by these projections.

Since the crushable member consists of a metal, it has almost no elastic recovery force. As a result, once the member has been used, it cannot be used again. However, in such bonding apparatus heating devices, powdered metal from the lead frames falls into the guide grooves so that the guide grooves become soiled; accordingly, on a daily or weekly basis, the cover is removed and the guide groove areas are cleaned. In this case, since the crushable member cannot be reused, the crushable member must be replaced with a new crushable member. In other words, numerous spare crushable members must be kept on hand, and reproducibility cannot be obtained when these parts are replaced.

Furthermore, in order to insure a constant amount of crushing of the crushable member, it is important to obtain a high degree of precision in the external diameter of the crushable member, the depth of the grooves in the heating body and the height of the projections on the cover, etc. Moreover, since the projections on the cover are caused to engage with the grooves in the heating body, working is difficult. As a result, the device becomes more expensive. In addition, since the crushable member is heated to high temperatures by the heating body, the useful life of the crushable member is short. Furthermore, since the cover and crushable member have surface roughness, it is difficult to obtain a perfectly tight seal.

SUMMARY OF THE INVENTION

Accordingly, the object of the present invention is to provide a heating device for a bonding apparatus which makes it possible to prevent the invasion of air from the joining surfaces of the heating body and cover without using a crushable member.

The object is accomplished by a unique structure of the present invention for a heating device for a bonding apparatus in which a cover is fastened to a heating body that has a guide groove for guiding lead frames, and the unique structure is that gas grooves which run along the guide groove are formed in either the heating body or the cover so as to be located at the joining surfaces of the heating body and cover, and an inert gas is supplied to these gas grooves.

The object is accomplished by another unique structure of the present invention for a heating device for a bonding apparatus in which a pair of guide rails in which guide grooves that guide lead frames are formed are installed so as to face each other on both sides of a heating body, and an upper cover is fastened to the pair of guide rails so that the upper cover covers the heating body and the guide grooves, and the unique structure of the present invention is that: a lower cover is fastened to the undersurfaces of the pair of guide rails; respective gas grooves are formed in either the pair of guide rails or the upper cover so as to be located at the joining surfaces, of the pair of guide rails and the upper cover, and in either the pair of guide rails and the lower cover at the joining surfaces of the pair of guide rails and the lower cover; and an insert gas is supplied to the gas grooves.

DETAILED DESCRIPTION OF THE PREFERRED EMBODIMENTS

Figure 1:
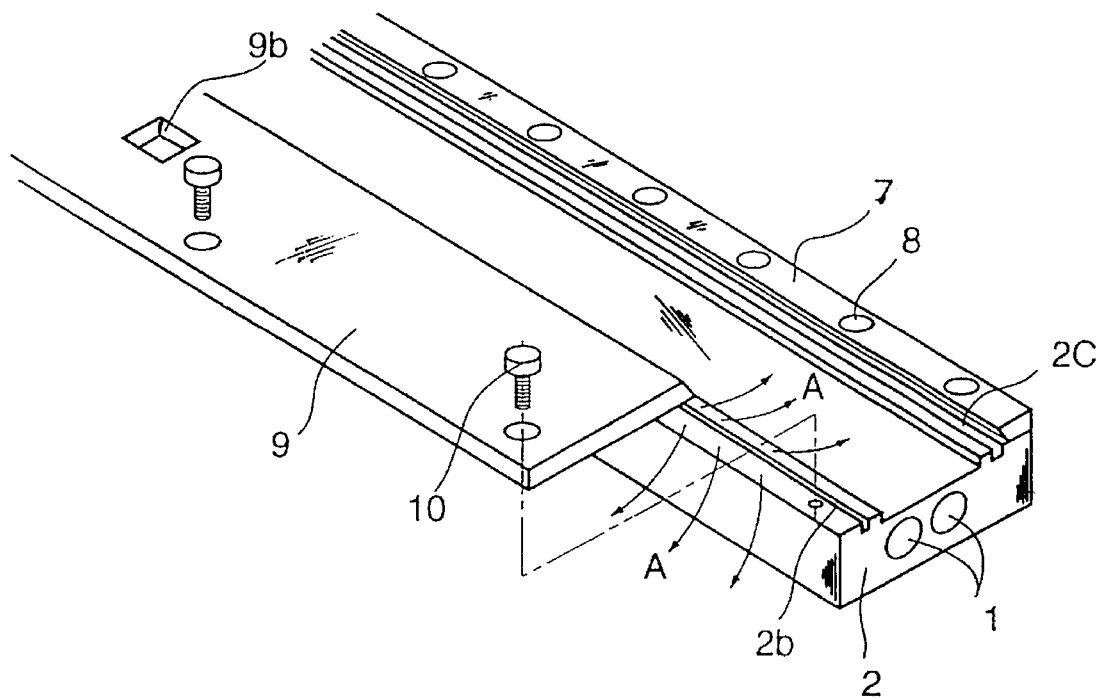
FIG. 1 illustrates a first embodiment of the heating device for a bonding apparatus provided by the present invention, and is a perspective view which shows the cover removed.
Figure 2:
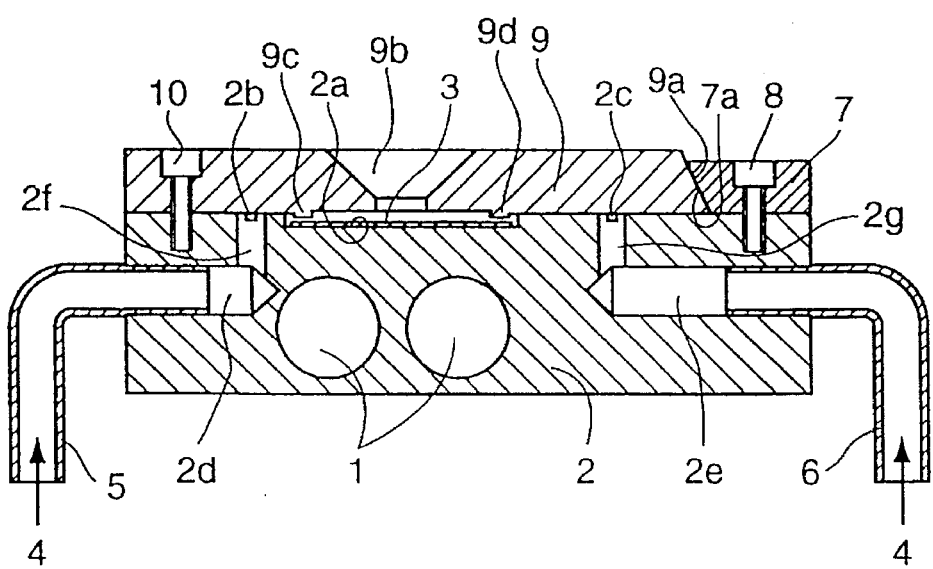
FIG. 2 is a sectional view of the device shown in FIG. 1.
Figure 3:
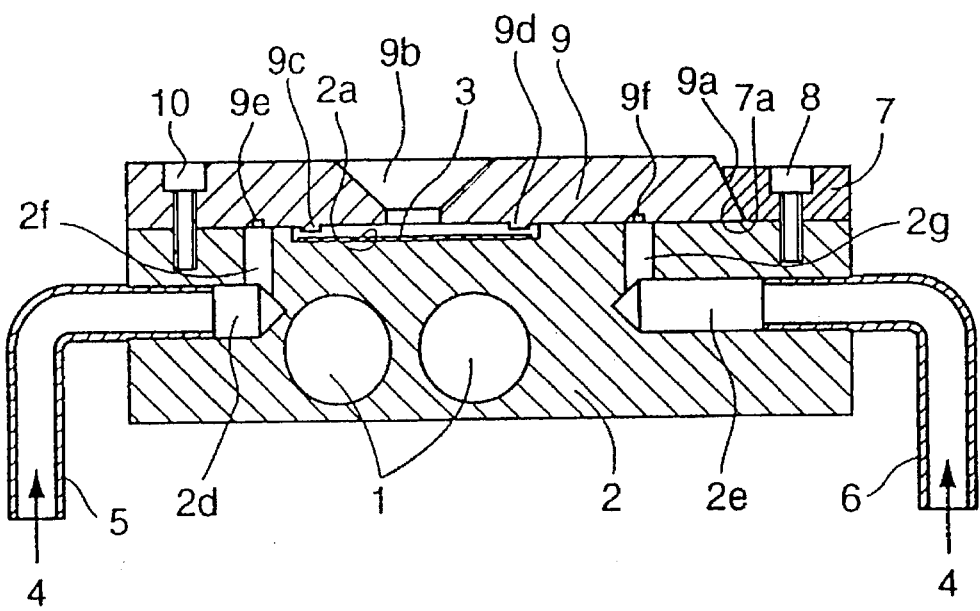
FIG. 3 is a sectional view which illustrates a second embodiment of the heating device for a bonding apparatus provided by the present invention.
Figure 4:
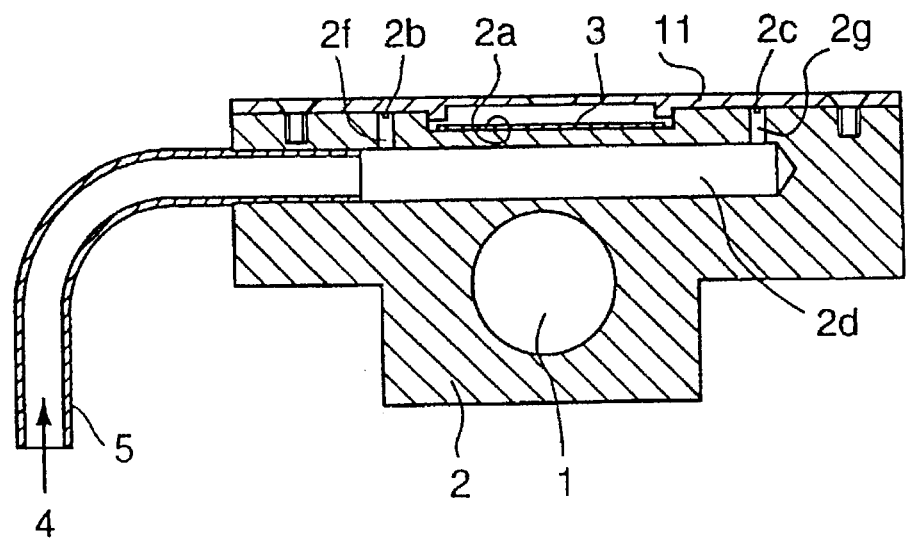
FIG. 4 is a sectional view which illustrates a third embodiment of the heating device for a bonding apparatus provided by the present invention.

In the device shown in FIGS. 1 through 4, a guide groove 2a which guides lead frames 3 is formed in a heating body 2. A cover 9 is fastened to the heating body 2 so that the cover 9 covers the guide groove 2a formed in the heating body 2. At the joining surfaces of the heating body 2 and cover 9, gas grooves 2b and 2c are formed in the heating body 2 along the guide groove 2a (as shown in FIGS. 1, 2 and 4), or gas grooves 9e and 9f are formed in the cover 9 along the guide groove 2a (as shown in FIG. 3). Furthermore, an inert gas 4 is supplied to these gas grooves 2b, 2c or 9e, 9f.

Figure 5:
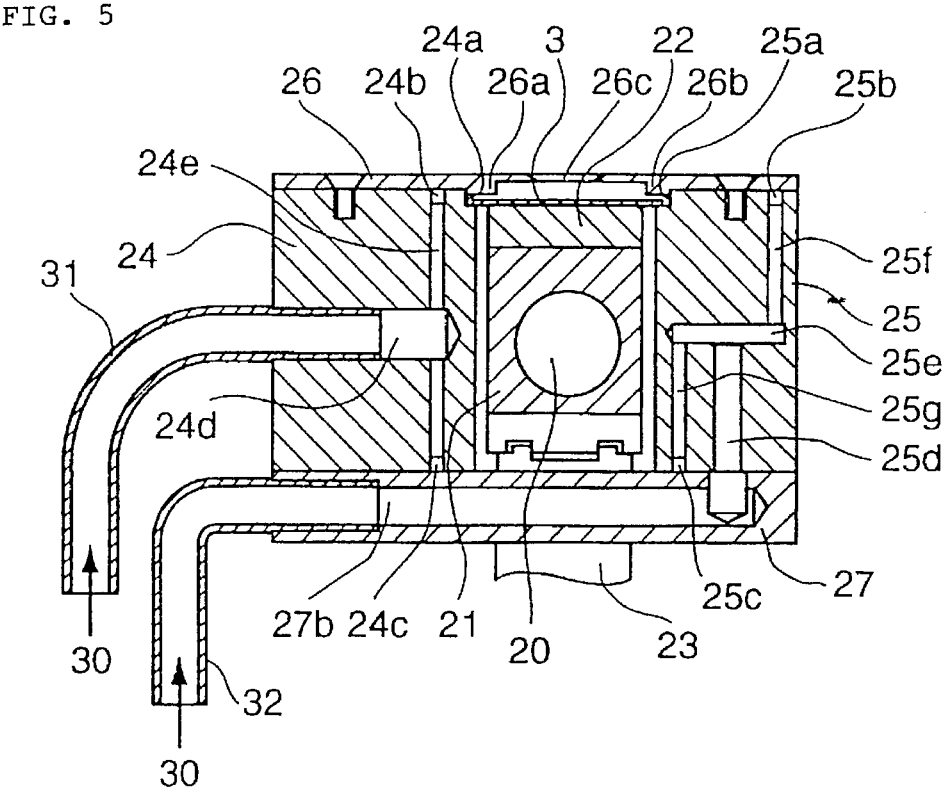
FIG. 5 is a sectional view which illustrates a fourth embodiment of the heating device for a bonding apparatus provided by the present invention.
Figure 6:
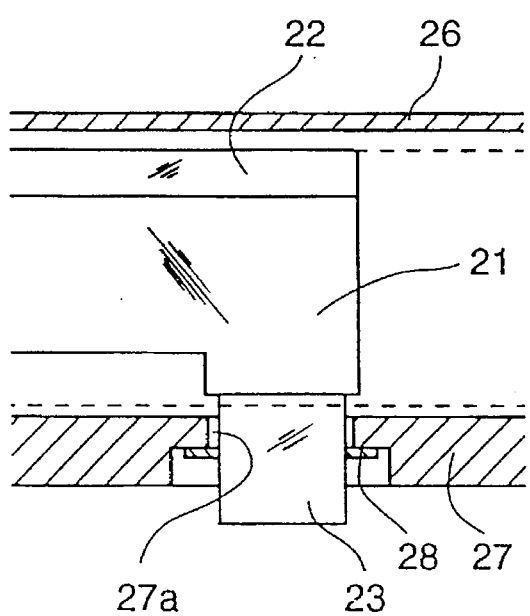
FIG. 6 is a sectional view of the heating body holder part in FIG. 5.

In the device shown in FIGS. 5 through 7, a pair of guide rails 24, 25 in which guide grooves 24a, 25b that guide lead frames 3 are formed are installed so as to face each other on both sides of a heating body 21. An upper cover 26 and a lower cover 27 are fastened to the upper surfaces and undersurfaces of the pair of guide rails 24, 25. Gas grooves 24b and 25b are formed in the guide rails 24 and 25 at the joining surfaces of the guide rails 24 and 25 and the upper cover 26. Furthermore, gas grooves 24c and 25c are formed in the guide rails 24 and 25 at the joining surfaces of the guide rails 24 and 25 and the lower cover 27. Moreover, an inert gas 30 is supplied to these gas grooves 24b, 25b, 24c, 25c. Furthermore, it would also be possible to form the gas grooves 24b, 25b, 24c, 25c in the upper cover 26 and lower cover 27.

The first embodiment of the present invention is described in FIGS. 1 and 2.

In this embodiment, a guide groove 2a which guides lead frames 3 is formed in the upper surface of a heating body 2 which contains cartridge heaters 1. Furthermore, gas grooves 2b and 2c are formed along the guide groove 2a on both sides of the guide groove 2a in the upper surface of the heating body 2. Moreover, gas passages 2d and 2e are formed in both side surfaces of the heating body 2, and vertical gas passages 2f and 2g are formed so that the gas passages 2d and 2e communicate with the gas grooves 2b and 2c. Gas supply pipes 5 and 6 which supply an inert gas 4 are connected to the gas passages 2f and 2g.

A receiving cover 7 is fastened to the upper surface of the heating body 2 by means of bolts 8 in a position located to the outside of the gas groove 2c. An inclined surface 7a which is inclined so that the lower end thereof is located further outward is formed on the inside surface of the receiving cover 7. Furthermore, a cover 9 is fastened to the upper surface of the heating body 2 by means of bolts 10 so that the guide groove 2a and gas grooves 2b and 2c are covered by the cover 7. The inclined surface 9a of the cover 9 which faces the inclined surface 7a of the receiving cover 7 is inclined in the same direction as the inclined surface 7a. A bonding window 9b which allows bonding operations to be performed on the lead frames 3 from above is formed in the cover 9. Furthermore, projections 9c and 9d are formed on the cover 9 along both side surfaces of the guide groove 2a.

In operation, the inert gas 4 that is supplied to the gas supply pipes 5 and 6 is supplied to the gas grooves 2b and 2c via the gas passages 2d, 2e, 2f, 2g. The inert gas 4 that is supplied to the gas grooves 2b and 2c flows along the gas grooves 2b and 2c and forms a gas curtain. At the same time, as is indicated by the arrows A in FIG. 1, the inert gas 4 is discharged to the outside and into the guide groove 2a via any gap between the heating body 2 and the cover 9. The action of this gas discharge prevents air from entering the guide groove 2a from the outside.

Thus, since gas grooves 2b and 2c are formed in portions of the heating body 2 located at the joining surfaces of the heating body 2 and the cover 9, and since an inert gas 4 is supplied to these gas grooves 2b and 2c, the entry of air can be prevented without using a crushable member. As a result, various inconveniences arising from the use of a crushable member are eliminated.

FIG. 3 illustrates the second embodiment of the present invention.

In the first embodiment, the gas grooves 2b and 2c are formed in the heating body 2. In this second embodiment, gas grooves 9e and 9f are formed in the cover 9 along the guide groove 2a. An effect which is the same as that of the first embodiment can be obtained using this construction as well.

Furthermore, in the first and second embodiments (FIGS. 1 through 3), the receiving cover 7 is fastened to the heating body 2; however, it would also be possible to form the receiving cover 7 as an integral part of the heating body 2.

FIG. 4 illustrates the third embodiment of the present invention. In FIG. 4, parts which are the same as those in FIGS. 1 through 3, or which correspond to parts in FIGS. 1 through 3, are described using the same symbols.

In the third embodiment shown in FIG. 4, the receiving cover 7 and cover 9 used in the embodiments of FIGS. 1 through 3 are formed in a single cover 11.

In the embodiments of FIGS. 1 through 3, the gas passages 2d and 2e are formed on both sides of the heating body 2, and gas supply pipes 5 and 6 are provided so as to communicate with these gas passages 2d and 2e.

In the third embodiment shown in FIG. 4, the gas passage 2e formed in the previous embodiments is not formed. Instead, the gas passage 2d is extended to a point beneath the gas passage 2g, and a gas supply pipe 5 is connected to the gas passage 2d. An effect which is the same as that obtained in the previous embodiments can be obtained using this construction as well.

FIGS. 5 and 6 illustrate the fourth embodiment of the present invention. In the first through third embodiments, the guide groove 2a is formed in the heating body 2; however, in the fourth embodiment, the heating device has guide rails that are not formed on the heating body.

In particular, a hot plate 22 is provided on the upper surface of a heating body 21 which contains a cartridge heater 20, and this heating body 21 is connected to a heating body holder 23 which is raised and lowered by a vertical driving mechanism (not shown). A pair of guide rails 24 and 25 which guide lead frames 3 are installed so as to face each other on both sides of the heating body 21. Guide grooves 24a and 25a are formed in the upper surfaces of the guide rails 24 and 25. An upper cover 26 and a lower cover 27 are fastened to the upper surfaces and undersurfaces of the guide rails 24 and 25. A hole 27a which allows the heating body holder 23 to move up and down is formed in the lower cover 27. A packing member 28 is fastened to the lower cover 27 so that any gap existing between the heating body holder 23 and the hole 27a is sealed.

Gas grooves 24b, 25b and 24c, 25c are formed in the upper surfaces and undersurfaces of the guide rails 24 and 25 along the guide grooves 24a and 25a. Gas passages 24d and 27b are formed in the guide rail 24 and the side surface of the lower cover 27.

A vertical gas passage 24e is formed in the guide rail 24 so that the gas passage 24d communicates with the gas grooves 24b and 24c.

A gas passage 25d which extends vertically from the gas passage 27b, a gas passage 25e which extends horizontally from the gas passage 25d, and gas passages 25f and 25g which extend vertically upward and downward from the gas passage 25e and communicate with the gas grooves 25b and 25c are formed in the guide rail 25 so that the gas passage 27b communicates with the gas grooves 25b and 25c.

Gas supply pipes 31 and 32 which supply an inert gas 30 are connected to the gas passages 24d and 27b.

Projections 26a and 26b are formed on the upper cover 26 along both side surfaces of the guide grooves 24a and 25a, and a bonding window 26c is formed in the upper cover 26 above the heating body 21.

In operation, the inert gas 30 which is supplied to the gas supply pipe 31 is supplied to the gas grooves 24b and 24c via the gas passages 24d and 24e. The inert gas 30 which is supplied to the gas supply pipe 32 is supplied to the gas grooves 25b and 25c via the gas passages 27b, 25d, 25e, 25f and 25g. As in the case of the previous embodiments, the inert gas 30 supplied to the gas grooves 24b, 25b and 24c, 25c flows along the gas grooves 24b, 25b and 24c, 25c so that a gas curtain is formed, and the inert gas 30 is discharged to the outside and into the guide grooves 24a and 25a via any gap between the guide rails 24 and 25 and the upper cover 26 and lower cover 27, so that air is prevented from entering the area around the heating body 21 from the outside.

In the fourth embodiment, the gas grooves 24b, 25b and 24c, 25c are formed in the guide rails 24 and 25. However, it is possible to form respective gas grooves in the upper cover 26 and lower cover 27.

As seen from the above, in the present invention, a cover is provided on a heating body in which a guide groove that guides lead frames is formed, and gas grooves which run along the guide groove are formed in either the heating body or the cover so as to be located at the joining surfaces of the heating body and cover, and an inert gas is supplied to these gas grooves.

Furthermore, in a heating device for a bonding apparatus in which a pair of guide rails, in which guide grooves that guide lead frames are formed, are installed so as to face each other on both sides of a heating body, an upper cover is fastened to the pair of guide rails so as to cover the heating body and the guide grooves, a lower cover is provided on the undersurfaces of the pair of guide rails. In addition, gas grooves are formed in either the pair of guide rails or the upper cover so as to be located at the joining surfaces of the pair of guide rails and the upper cover, and gas grooves are further formed in either the pair of guide rails and the lower cover so as to be located at the joining surfaces of the pair of guide rails and the lower cover. An inert gas is supplied to these gas grooves.

Accordingly, the entry of air through the joining surfaces of the heating body and can be prevented without using a crushable member.

We claim:

1. A heating device for a bonding apparatus in which a cover is provided on a heating body in which a guide groove that guides lead frames is formed and said cover covers said guide groove, wherein gas grooves which run along said guide groove are provided in either said heating body or said cover so as to be located at joining surfaces of said heating body and cover, and an inert gas is supplied to said gas grooves.

2. A heating device for a bonding apparatus in which a pair of guide rails, in which guide grooves that guide lead frames are formed, are provided so as to face each other on both sides of a heating body, and a first cover is provided on first surfaces of said pair of guide rails so as to cover said heating body and guide grooves, wherein a second cover is provided on second surfaces of said pair of guide rails, first gas grooves are formed in either said first surfaces of said pair of guide rails or said first cover so as to be located at joining surfaces of said first surfaces of said pair of guide rails and said first cover, second gas grooves are formed in either said second surfaces of said pair of guide rails and said second cover so as to be located at an joining surfaces of said second surfaces of said pair of guide rails and said second cover, and an inert gas is supplied to said gas grooves.

* * * * *